(12) United States Patent
Khosravirad et al.

(10) Patent No.: US 12,328,663 B2
(45) Date of Patent: Jun. 10, 2025

(54) RESOURCE ALLOCATION IN JOINT COMMUNICATION AND SENSING

(71) Applicant: Nokia Solutions and Networks Oy, Espoo (FI)

(72) Inventors: Saeed Reza Khosravirad, Mountainside, NJ (US); Junfeng Guan, Champaign, IL (US); Harish Viswanathan, Basking Ridge, NJ (US); Jakub Sapis, New York, NY (US)

(73) Assignee: Nokia Solutions and Networks Oy, Espoo (FI)

( * ) Notice: Subject to any disclaimer, the term of this patent is extended or adjusted under 35 U.S.C. 154(b) by 173 days.

(21) Appl. No.: 18/116,424

(22) Filed: Mar. 2, 2023

(65) Prior Publication Data

US 2023/0284122 A1    Sep. 7, 2023

(30) Foreign Application Priority Data

Mar. 4, 2022   (FI) ...................................... 20225198

(51) Int. Cl.
*H04W 48/16* (2009.01)
*H04L 5/00* (2006.01)
*H04L 25/02* (2006.01)

(52) U.S. Cl.
CPC .......... *H04W 48/16* (2013.01); *H04L 5/0048* (2013.01); *H04L 25/0224* (2013.01)

(58) Field of Classification Search
CPC ... H04W 48/16; H04L 5/0048; H04L 25/0224
See application file for complete search history.

(56) References Cited

U.S. PATENT DOCUMENTS

| | | | |
|---|---|---|---|
| 11,564,036 B1* | 1/2023 | Kamath Koteshwara | .................... H04R 5/027 |
| 11,982,737 B1* | 5/2024 | Liu | ........................ G01S 15/876 |
| 12,174,640 B2* | 12/2024 | Ferguson | ................ G06V 20/56 |
| 2021/0076349 A1 | 3/2021 | Ioffe et al. | ........................... 64/6 |
| 2021/0076367 A1 | 3/2021 | Bayesteh et al. | |
| 2022/0030440 A1 | 1/2022 | Park et al. | |
| 2022/0053411 A1* | 2/2022 | Bao | ........................ H04W 48/04 |

(Continued)

FOREIGN PATENT DOCUMENTS

| | | | | |
|---|---|---|---|---|
| CA | 3139773 A1 * | 11/2020 | ........... | G01S 13/003 |
| EP | 3767324 A1 | 7/2019 | | |

(Continued)

OTHER PUBLICATIONS

Wild, T. et al., "Joint Design of Communication and Sensing for Beyond 5G and 6G Systems," IEEE Access, vol. 9, Feb. 15, 2021, pp. 30845-30857.

(Continued)

*Primary Examiner* — Michael J Moore, Jr.
(74) *Attorney, Agent, or Firm* — McCarter & English, LLP (57) ABSTRACT

Disclosed is a method including transmitting one or more reference signals to one or more user devices; performing preliminary sensing over a sensing area of interest based at least partly on the one or more reference signals; allocating, based at least partly on the preliminary sensing, radio resources for performing sensing with a higher resolution than a resolution of the preliminary sensing; and performing the sensing with the higher resolution over the sensing area of interest by using the allocated radio resources.

14 Claims, 6 Drawing Sheets

(56) References Cited

U.S. PATENT DOCUMENTS

2022/0225121 A1* 7/2022 Wanuga ............... H04L 5/0048
2023/0221754 A1* 7/2023 Sobel ..................... G01S 17/10

FOREIGN PATENT DOCUMENTS

WO  WO-2020043592 A1  3/2020
WO  WO-2021/248404 A1  12/2021
WO  WO-2021/248448 A1  12/2021

OTHER PUBLICATIONS

Luong, N. C. et al., "Radio Resource Management in Joint Radar and Communication: A Comprehensive Survey," IEEE Communications Surveys & Tutorials, vol. 23, No. 2, Apr. 1, 2021, pp. 780-814.

* cited by examiner

RESOURCE ALLOCATION IN JOINT COMMUNICATION AND SENSING

FIELD

The following example embodiments relate to wireless communication and to wireless sensing.

BACKGROUND

As resources are limited, it is desirable to optimize the usage of network resources.

SUMMARY

The scope of protection sought for various example embodiments is set out by the claims. The example embodiments and features, if any, described in this specification that do not fall under the scope of the claims are to be interpreted as examples useful for understanding various example embodiments.

According to an aspect, there is provided an apparatus comprising at least one processor, and at least one memory including computer program code, wherein the at least one memory and the computer program code are configured, with the at least one processor, to cause the apparatus to: transmit one or more reference signals to one or more user devices; perform preliminary sensing over a sensing area of interest based at least partly on the one or more reference signals; allocate, based at least partly on the preliminary sensing, radio resources for performing sensing with a higher resolution than a resolution of the preliminary sensing; and perform the sensing with the higher resolution over the sensing area of interest by using the allocated radio resources.

According to another aspect, there is provided an apparatus comprising means for: transmitting one or more reference signals to one or more user devices; performing preliminary sensing over a sensing area of interest based at least partly on the one or more reference signals; allocating, based at least partly on the preliminary sensing, radio resources for performing sensing with a higher resolution than a resolution of the preliminary sensing; and performing the sensing with the higher resolution over the sensing area of interest by using the allocated radio resources.

According to another aspect, there is provided a method comprising: transmitting one or more reference signals to one or more user devices; performing preliminary sensing over a sensing area of interest based at least partly on the one or more reference signals; allocating, based at least partly on the preliminary sensing, radio resources for performing sensing with a higher resolution than a resolution of the preliminary sensing; and performing the sensing with the higher resolution over the sensing area of interest by using the allocated radio resources.

According to another aspect, there is provided a computer program comprising program instructions which, when run on an apparatus, cause the apparatus to perform at least the following: transmitting one or more reference signals to one or more user devices; performing preliminary sensing over a sensing area of interest based at least partly on the one or more reference signals; allocating, based at least partly on the preliminary sensing, radio resources for performing sensing with a higher resolution than a resolution of the preliminary sensing; and performing the sensing with the higher resolution over the sensing area of interest by using the allocated radio resources.

According to another aspect, there is provided a computer program comprising instructions for causing an apparatus to perform at least the following: transmitting one or more reference signals to one or more user devices; performing preliminary sensing over a sensing area of interest based at least partly on the one or more reference signals; allocating, based at least partly on the preliminary sensing, radio resources for performing sensing with a higher resolution than a resolution of the preliminary sensing; and performing the sensing with the higher resolution over the sensing area of interest by using the allocated radio resources.

According to another aspect, there is provided a computer readable medium comprising program instructions for causing an apparatus to perform at least the following: transmitting one or more reference signals to one or more user devices; performing preliminary sensing over a sensing area of interest based at least partly on the one or more reference signals; allocating, based at least partly on the preliminary sensing, radio resources for performing sensing with a higher resolution than a resolution of the preliminary sensing; and performing the sensing with the higher resolution over the sensing area of interest by using the allocated radio resources.

According to another aspect, there is provided a non-transitory computer readable medium comprising program instructions for causing an apparatus to perform at least the following: transmitting one or more reference signals to one or more user devices; performing preliminary sensing over a sensing area of interest based at least partly on the one or more reference signals; allocating, based at least partly on the preliminary sensing, radio resources for performing sensing with a higher resolution than a resolution of the preliminary sensing; and performing the sensing with the higher resolution over the sensing area of interest by using the allocated radio resources.

According to another aspect, there is provided a system comprising at least a communication function, a radio scheduler, a sensing scheduling interface, a low-resolution sensing function, and a high-resolution sensing function. The communication function is configured to: transmit one or more reference signals to one or more user devices. The low-resolution sensing function is configured to: perform preliminary sensing over a sensing area of interest based at least partly on the one or more reference signals. The sensing scheduling interface is configured to: transmit, to the radio scheduler, based at least partly on the preliminary sensing, a resource request for sensing with a higher resolution than a resolution of the preliminary sensing. The radio scheduler is configured to: allocate, based at least partly on the resource request, radio resources for performing the sensing with the higher resolution. The high-resolution sensing function is configured to: perform the sensing with the higher resolution over the sensing area of interest by using the allocated radio resources.

According to another aspect, there is provided a system comprising at least a communication function, a radio scheduler, a sensing scheduling interface, a low-resolution sensing function, and a high-resolution sensing function. The communication function comprises means for: transmitting one or more reference signals to one or more user devices. The low-resolution sensing function comprises means for: performing preliminary sensing over a sensing area of interest based at least partly on the one or more reference signals. The sensing scheduling interface comprises means for: transmitting, to the radio scheduler, based at least partly on the preliminary sensing, a resource request for sensing with a higher resolution than a resolution of the preliminary sensing. The radio scheduler comprises means for: allocating, based at least partly on the resource request, radio resources for performing the sensing with the higher resolution. The high-resolution sensing function comprises means for: performing the sensing with the higher resolution over the sensing area of interest by using the allocated radio resources.

BRIEF DESCRIPTION OF THE DRAWINGS

In the following, various example embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different example embodiments will be described using, as an example of an access architecture to which the example embodiments may be applied, a radio access architecture based on long term evolution advanced (LTE Advanced, LTE-A), new radio (NR, 5G), beyond 5G, or sixth generation (6G) without restricting the example embodiments to such an architecture, however. It is obvious for a person skilled in the art that the example embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G may include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

Figure 1:
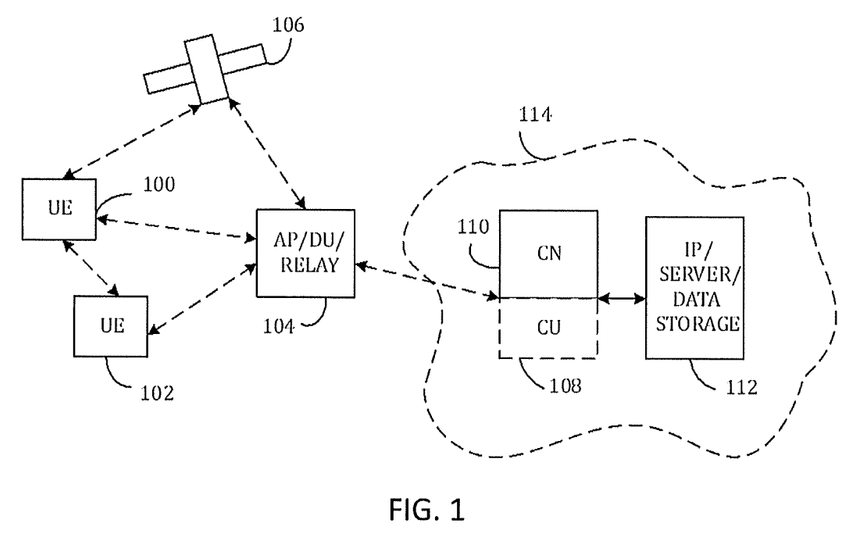
FIG. 1 illustrates an example embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The example embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node 104, such as an evolved Node B (abbreviated as eNB or eNodeB) or a next generation Node B (abbreviated as gNB or gNodeB), providing the cell. The physical link from a user device to an access node may be called uplink or reverse link, and the physical link from the access node to the user device may be called downlink or forward link. It should be appreciated that access nodes or their functionalities may be implemented by using any node, host, server or access point etc. entity suitable for such a usage.

A communication system may comprise more than one access node, in which case the access nodes may also be configured to communicate with one another over links, wired or wireless, designed for the purpose. These links may be used for signaling purposes. The access node may be a computing device configured to control the radio resources of communication system it is coupled to. The access node may also be referred to as a base station, an access point or any other type of interfacing device including a relay station capable of operating in a wireless environment. The access node may include or be coupled to transceivers. From the transceivers of the access node, a connection may be provided to an antenna unit that establishes bi-directional radio links to user devices. The antenna unit may comprise a plurality of antennas or antenna elements. The access node may further be connected to core network 110 (CN or next generation core NGC). Depending on the system, the counterpart on the CN side may be a serving gateway (S-GW, routing and forwarding user data packets), packet data network gateway (P-GW) for providing connectivity of user devices to external packet data networks, user plane function (UPF), mobility management entity (MME), access and mobility management function (AMF), or location management function (LMF), etc.

The user device illustrates one type of an apparatus to which resources on the air interface may be allocated and assigned, and thus any feature described herein with a user device may be implemented with a corresponding apparatus, such as a relay node. The user device may also be called a subscriber unit, mobile station, remote terminal, access terminal, user terminal, terminal device, or user equipment (UE) just to mention but a few names or apparatuses.

An example of such a relay node may be a layer 3 relay (self-backhauling relay) towards the access node. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and user device(s), and/or between the IAB node and other IAB nodes (multi-hop scenario).

Another example of such a relay node may be a layer 1 relay called a repeater. The repeater may amplify a signal received from an access node and forward it to a user device, and/or amplify a signal received from the user device and forward it to the access node.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable or wearable device with radio parts (such as a watch, earphones or eyeglasses) and the computation may be carried out in the cloud. The user device (or in some example embodiments a layer 3 relay node) may be configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloudRAN architecture.

It should also be understood that the distribution of labour between core network operations and base station operations may differ from that of the LTE or even be non-existent. Some other technology advancements that may be used include big data and all-IP, which may change the way networks are being constructed and managed. 5G (or new radio, NR) networks may be designed to support multiple hierarchies, where MEC servers may be placed between the core and the base station or access node. It should be appreciated that MEC may be applied in 4G networks as well.

5G may also utilize non-terrestrial communication, for example satellite communication, to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of access nodes, the user device may have an access to a plurality of radio cells and the system may also comprise other apparatuses, such as physical layer relay nodes or other network elements, etc. At least one of the access nodes may be a Home eNodeB or a Home gNodeB.

Furthermore, the access node may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) (also known as a centralized unit) that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the access node. The DU may be defined as a logical node hosting radio link control (RLC), medium access control (MAC) and/or physical (PHY) layers of the access node. The operation of the DU may be at least partly controlled by the CU. The CU may comprise a control plane (CU-CP), which may be defined as a logical node hosting the RRC and the control plane part of the PDCP protocol of the CU for the access node. The CU may further comprise a user plane (CU-UP), which may be defined as a logical node hosting the user plane part of the PDCP protocol and the SDAP protocol of the CU for the access node.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The access node(s) of FIG. 1 may provide any kind of these cells. A cellular radio system may be implemented as a multilayer network including several kinds of cells. In multilayer networks, one access node may provide one kind of a cell or cells, and thus a plurality of access nodes may be needed to provide such a network structure.

For fulfilling the need for improving the deployment and performance of communication systems, the concept of "plug-and-play" access nodes may be introduced. A network which may be able to use "plug-and-play" access nodes, may include, in addition to Home eNodeBs or Home gNodeBs, a Home Node B gateway, or HNB-GW (not shown in FIG. 1). An HNB-GW, which may be installed within an operator's network, may aggregate traffic from a large number of Home eNodeBs or Home gNodeBs back to a core network.

Beyond 5G and 6G technologies are envisioned to enable joint communication and sensing (JCAS) as a new use case of wireless communication systems. The abundance of existing wireless communication infrastructure, as well as the inevitable growth in deployment of new hardware, provide an opportunity to utilize those cellular access points and devices for large scale sensing of the whereabouts towards enabling the digital twin of the world.

In radar sensing, a transmitted radar signal may be reflected by a target object. The receiver can utilize the reflected signal and, through processing, determine physical features, such as distance, location, direction, velocity, size, etc., of the target object.

Some example embodiments relate to sharing radio resources between communication and sensing. Some example embodiments may be applied, for example, to an orthogonal frequency-division multiplexing (OFDM) based cellular JCAS system. However, it should be noted that some example embodiments may be applicable to any waveform type with time-frequency multiplexing capability in any frequency band.

The time-frequency multiplexing feature of OFDM-based communication provides a possibility to carry data as well as a sensing reference signal over the same medium at the same time. For example, in case of 5G NR and its predecessor technologies, there exists plenty of general-purpose references signals, such as demodulation reference signal (DMRS) and primary/secondary synchronization signals (PSS/SSS). Thus, the overhead imposed by the sensing function over the communication system may be reduced by re-using those general-purpose reference signals for sensing.

In JCAS, the radio resource overhead from sensing may grow large in proportion to the number of beams, amount of time-frequency resources required for high-resolution radar sensing, and how frequently the sensing function needs to render a radar map. For example, for the case of mmWave JCAS with phased array antennas, which provide narrow directional beams, the sensing overhead may be further increased in proportion to the number of beams that are required to cover the sensing area of interest. This is depicted in FIG. 2, where a mmWave JCAS system is communicating data with UEs, while sensing traffic over a desired area.

Figure 2:
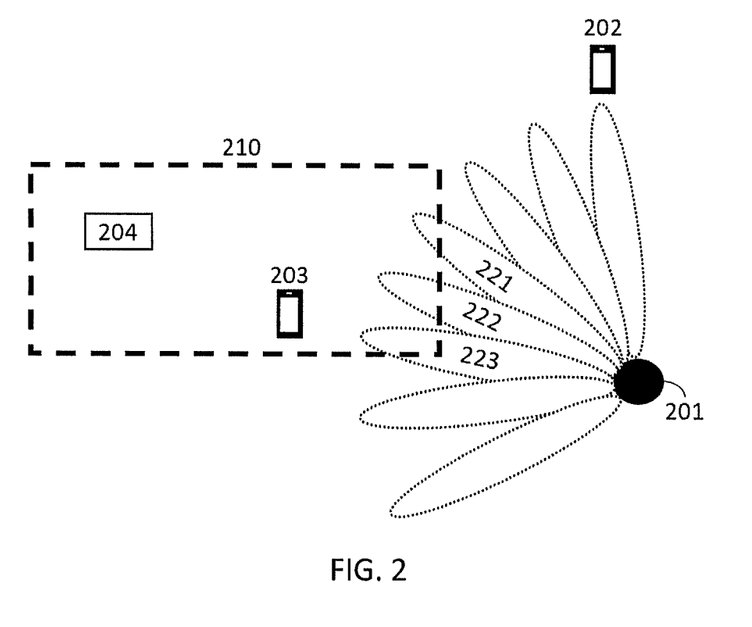
FIG. 2 illustrates an example embodiment of a joint communication and sensing system communicating with user devices, while simultaneously performing sensing over a sensing area of interest.

FIG. 2 illustrates an example embodiment of a JCAS system 201 with mmWave phased array antenna serving data to communicate with UEs 202, 203, while simultaneously performing sensing over a desired sensing area 210 via a set of beams 221, 222, 223 used for sensing. The JCAS system 201 may comprise an access point with beam-based access. The desired sensing area 210 may comprise one or more sensing objects 203, 204, such as a vehicle and/or a UE 203 that is communicating with the access point 201 in the same location. The desired sensing area may also be referred to as a sensing area of interest.

The term "beam" may refer to a communication resource. Different beams may be considered as different resources. A beam may also be represented as a spatial filter, spatial direction, or angle. A technology for forming a beam may be a beamforming technology or another technology. The beamforming technology may be specifically a digital beamforming technology, analog beamforming technology, or a hybrid digital/analog beamforming technology. A communication device (e.g., UE or access point) may communicate with another communication device through one or more beams. One beam may include one or more antenna ports and be configured for a data channel, a control channel, or the like. The one or more antenna ports forming one beam may also be considered as an antenna port set. A beam may be configured with a set of resources, or a set of resources for measurement.

In some scenarios, such as JCAS for urban traffic sensing, the overhead may be significant, since the sensing areas of interest may be large, thus requiring high-resolution radar mapping using several directional beams. For example, for sensing of traffic objects (e.g., a vehicle) in a street crossing, over 10% signaling overhead may be imposed by the sensing function. The exact amount of overhead may be impacted by several parameters, such as deployment density of JCAS access points, number and variety of objects targeted for sensing, and the desirable detection rate or false alarm rate. Nevertheless, at the radio resource management level, the JCAS system should take immediate and necessary actions to curb the overhead imposed by the sensing function.

For efficient resource management, the JCAS system needs to be able to adapt the resource allocation and re-use between the communication and sensing functions. Some example embodiments address the challenge of radio resource management in JCAS and provide methods to opportunistically re-use the communication resources for sensing and vice versa (instead of using all radio resources for sensing, for example). Some example embodiments may enable a zero-overhead and zero-interruption sensing function for JCAS systems, which continuously monitors the sensing area of interest and triggers high-resolution sensing with additional overhead only when necessary.

Figure 3:
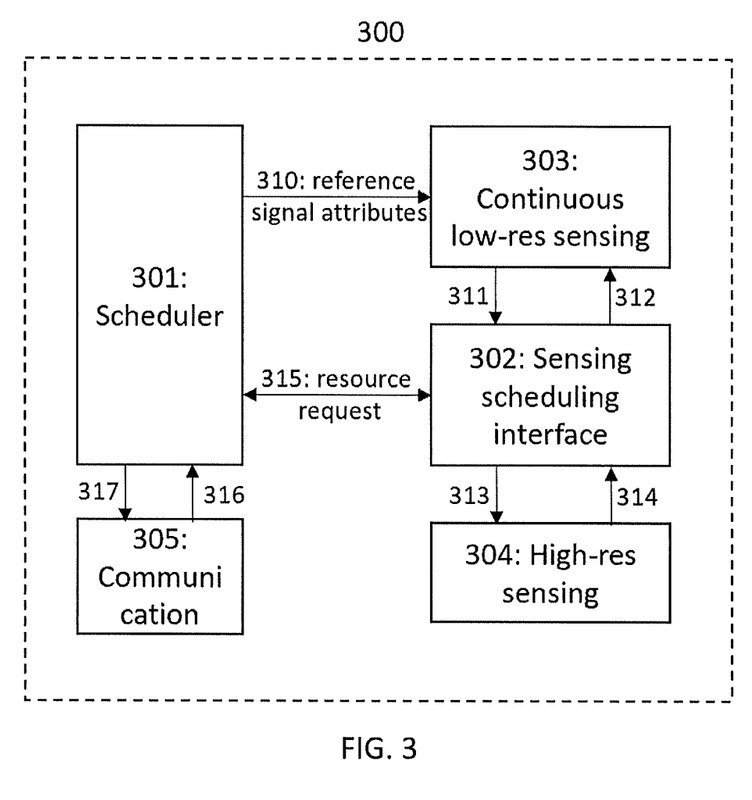
FIG. 3 illustrates a system according to an example embodiment.

FIG. 3 illustrates a JCAS system 300 according to an example embodiment. The JCAS system 300 may comprise, or be comprised in, an apparatus such as a network element (e.g., an access point) of a wireless communication network. FIG. 3 illustrates the different functions of the system, as well as the data exchange between the functions. The functions comprise a radio scheduler function 301 of a cellular communication system, a sensing scheduling interface function 302, a continuous low-resolution sensing function 303, a high-resolution sensing function 304, and a communication function 305.

The communication function 305 may be configured to deliver data packets received from the network to one or more UEs, and vice versa. For example, the communication function 305 may transmit one or more reference signals to the one or more UEs. The one or more reference signals may have multiple purposes, such as conveying information, and/or supporting the communication of data. For example, a channel state information reference signal (CSI-RS) may be used to determine channel quality for a radio channel between the communication function and the one or more UEs.

The continuous low-resolution sensing function 303 may re-use the one or more reference signals to perform preliminary sensing over a sensing area of interest based on a reflection of the transmitted one or more reference signals received at the radar receiver. The communication function 305 may transmit a resource request 316 to the radio scheduler function 301 to request radio resources for the communication function 305. The radio scheduler function 301 may allocate radio resources 317 to the communication function 305 in response to the resource request 316.

The continuous low-resolution sensing function 303 may operate on the basis of zero-overhead continuous scanning (e.g., leveraging the available reference signals in a 5G system) to detect the presence of traffic (e.g., one dimensional range or doppler). The continuous low-resolution sensing function 303 may receive one or more attributes 310 of the available physical channels from the radio scheduler function 301. Based on the received one or more attributes, the continuous low-resolution sensing function may determine the available physical reference signals, so that it imposes zero interruption on communication operation and zero overhead in radio resources.

Some examples of those channels (reference signals) are: primary synchronization signal (PSS), secondary synchronization signal (SSS) and physical broadcast channel (PBCH), phase-tracking reference signal (PTRS), physical downlink control channel (PDCCH) demodulation reference signal (DMRS), physical downlink shared channel (PDSCH) DMRS, and/or CSI-RS. The PSS and SSS together with the PBCH may also be jointly referred to as a synchronization signal block (SSB).

Upon detecting one or more objects in the sensing area of interest, the continuous low-resolution sensing function 303 may provide an object detection notification 311 to the sensing interface function 302. The object detection notification 311 may comprise the sensing metric(s) and confidence level(s) determined by the low-resolution sensing function 303. The sensing interface function 302 may indicate a notification periodicity 312 to the continuous low-resolution sensing function 303 for providing the object detection notifications.

Based on the input (object detection notification) 311 from the continuous low-resolution sensing function 303, the sensing scheduling interface function 302 may create a trigger 313 to initiate high-resolution sensing at the high-resolution sensing function 304. For example, the trigger may be based on a detection confidence level threshold to satisfy a desired detection rate and/or a desired false alarm rate. The sensing scheduling interface function 302 acts as an interface between the radio scheduler function 301 and the high-resolution radar sensing function 304 to prioritize time-frequency beam resources for the opportunistic high-resolution radar sensing. The detection confidence threshold may be updated based on the detection or false alarm feedback 314 from the high-resolution sensing function 304. The sensing scheduling interface may transmit a resource request 315 to the radio scheduler function 301 to request radio resources for the high-resolution sensing function 304, when triggering it.

When triggered, the high-resolution sensing function 304 uses the radio resources allocated by the radio scheduler function 301 to perform radar sensing with a higher resolution than the continuous low-resolution sensing function 303 to generate high-resolution radar maps, for example a two-dimensional (2D) map of the sensing area of interest, using for example range-doppler map to detect one or more features, such as location, size and/or velocity, of the one or more objects in the sensing area of interest. In other words, the high-resolution sensing function 304 may utilize more radio resources for sensing than the continuous low-resolution sensing function 303.

The radio scheduler function 301 may allocate radio resources for the high-resolution sensing function 304 based on the resource request 315 received from the sensing scheduling interface function 302. Furthermore, the radio scheduler function 301 may identify vacant resources not used by the communication and/or sensing functions, and allocate radio resources for radar sensing. In case of a UE with data traffic in a similar direction as the direction of sensing, the scheduler may utilize the vacant radio resources from sensing for data transmission to the UE. In case of vacant radio resources from the communication operation, the scheduler may allocate the vacant radio resources for the continuous low-resolution sensing to improve detection accuracy.

In a multi-AP network setup (i.e., a network comprising multiple access points), the functions may be run independently on each mmWave JCAS access point. Alternatively, the sensing scheduling interface function 302 may be run centrally on a central unit, while running the continuous low-resolution sensing function 303 and high-resolution sensing function 304 on one or more access points, or distributed units, that are connected to the central unit. For example, the central unit may refer to a CU of a split CU-DU access point architecture.

Figure 4A:
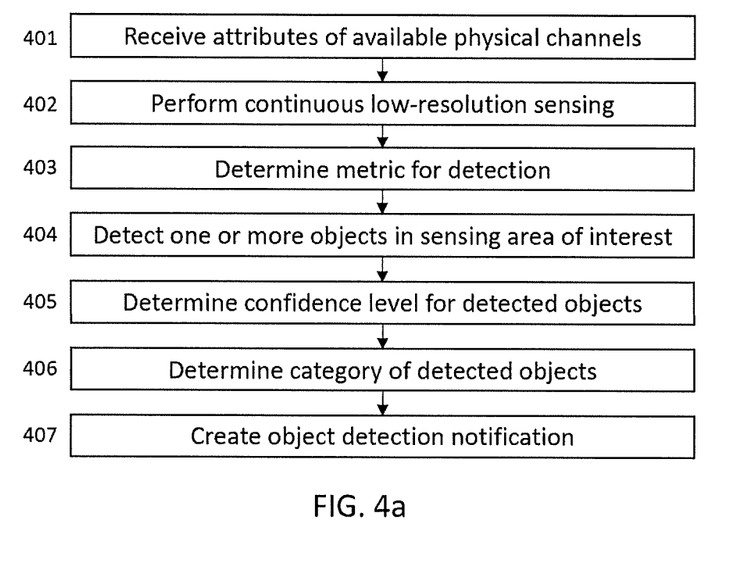
FIG. 4a illustrates a flow chart according to an example embodiment.

FIG. 4a illustrates a flow chart according to an example embodiment. FIG. 4a illustrates the operation of the continuous low-resolution sensing function 303 of FIG. 3. The steps illustrated in FIG. 4a may be performed by an apparatus such as, or comprised in, a network element (e.g., an access point) of a wireless communication network, wherein the apparatus is capable of joint communication and sensing.

The continuous low-resolution sensing function may be used to detect the presence of one or more objects in the sensing area of interest by detecting significant variances in reflected signal power in the environment. More specifically, it may create a range-Doppler-angle heatmap of the reflections and monitor the changes of power intensities in the heatmap.

Figure 4B:
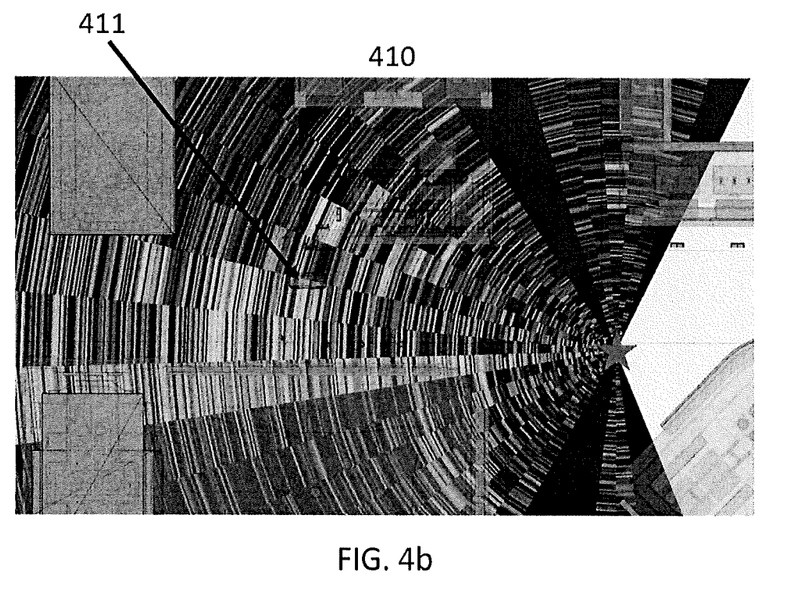
FIG. 4b illustrates an example of a heatmap.

FIG. 4b illustrates an example of a heatmap 410. When there is no object in the environment, only the background reflections may be captured, and the range-Doppler-angle heatmap remains unvarying. Whenever an object 411 appears and introduces new reflections in the heatmap, where the warmer colors may represent larger variations in the received reflection power, the low-resolution sensing function may identify the changes (i.e., detect the presence of the object) and report them to the sensing scheduler interface function for triggering the high-resolution sensing function.

Referring to FIG. 4a, in step 401, one or more attributes of one or more available physical channels are received from the radio scheduler. The physical channels may also be referred to as reference signals herein. The one or more available physical reference signals may be determined so that they create zero impact on the communication operation, such as scheduling, as well as zero overhead for radio resources. The channels may comprise one or more of: PSS, SSS and PBCH (a.k.a. SSB), PTRS, PDCCH DMRS and/or PDSCH DMRS.

For example, the radio scheduler may identify vacant PDSCH resources and make them available for sensing. In this case, one or more sensing reference signals may be transmitted over the vacant resources, when there is an absence of or limited data traffic. The radio scheduler may share the attributes of the one or more sensing reference signals with the continuous low-resolution sensing function.

In step 402, the continuous low-resolution sensing function utilizes the one or more references signals identified by the radio scheduler for continuous low-resolution sensing. For example, the continuous low-resolution sensing function may create a radar map of the sensing area of interest based on one or more reflected, scattered, or diffracted signals received at the radar receiver in response to transmitting the one or more reference signals from the transmitter. The continuous low-resolution sensing may also be referred to as preliminary sensing herein.

In step 403, one or more sensing metrics for detection are determined based on the density and duration of the available reference signals in time and frequency domains. The one or more metrics may be used to detect the presence of one or more objects in the sensing area of interest. Depending on the density and duration of the available reference signals in time and frequency domains, the continuous low-resolution sensing function may determine, for example, range or Doppler estimation as the metric for the detection.

Different reference symbols (pilot symbols) feature different spans and densities in frequency, time, and beam domains, which leads to different performances in range and Doppler estimations. Therefore, a couple variances of the radar heatmaps may be used as the metric for different types of reference signals.

For example, in the presence of a wideband DMRS, range estimation may be performed. When wideband DMRS signals are available, the low-resolution sensing function may be able to recover a high-resolution range profile from the reflections. However, since the DMRS signals may be transmitted with a single beam pattern and last for a limited number of symbol slots, the Doppler information cannot be resolved well, and only a single direction may be measured. Therefore, instead of the complete range-Doppler-angle heatmap, a reduced dimension range profile may be used as the metric.

On the other hand, in the presence of time-repetitive reference signals such as PTRS, a high-resolution Doppler profile may be reconstructed and used for the metric. In other words, with a narrowband and time-repetitive reference signal such as PTRS, Doppler estimation may be performed.

Similarly, two-dimensional range-Doppler, range-angle, or Doppler-angle heatmaps may also be utilized as the best available metric considering the resolvable range, Doppler, and angle information from the reference signal(s).

For example, the continuous low-resolution sensing function may utilize multiple reference signals to create a range-Doppler profile and utilize that to detect the presence of one or more objects in the sensing area of interest.

In step 404, once the radar heatmap of choice is created, it may be compared against the corresponding background reflection heatmap to detect the presence of one or more objects in the sensing area of interest.

In step 405, an object detection confidence level for the one or more detected objects is determined. The confidence level indicates a likelihood for the presence of the detected object. For example, a low confidence level may indicate a high likelihood for a false detection (i.e., no object may actually be present). The confidence level may be determined based on the one or more reference signals and/or the one or more sensing metrics. For example, the received power values of the reflected signal received in the radar receiver may show noticeable perturbation with regard to the background information, in which case the confidence level may be based on the perturbation. Another example is to use a trained machine learning model that takes the radar received signal as input and generates a confidence level value, for example between 0 and 1, based on the received signal. With a beam-based access and sensing setup, the confidence level may be determined per beam of a set of beams.

In step 406, a category of the one or more detected objects may be determined. For example, based on high speed, low speed, size, etc., the continuous low-resolution sensing function may categorize the one or more detected objects based on a pre-configured set of expected objects. An example categorization for traffic sensing may include cars representing large size and high velocity, bikes and motorbikes representing small size and high velocity, and pedestrians representing small size and low velocity.

In step 407, an object detection notification is created and sent to the sensing scheduling interface function, wherein the object detection notification comprises at least one of: the object detection confidence level, the one or more sensing metrics, and/or preliminary sensing results, such as the category of the one or more detected objects. The object detection notification may be sent periodically to the sensing scheduling interface function. The periodicity of providing the object detection notification may be determined by the sensing scheduling interface, for example, based on the amount of available reference signals that the radio scheduler function can afford for the continuous low-resolution sensing.

The preliminary sensing results (e.g., the category of the one or more detected objects) may help to reduce the search space and determine the amount of radio resources needed for the high-resolution sensing function.

For example, if the continuous low-resolution sensing function has determined that the detected object of interest is a large-size object (e.g., a car or a truck), whose reflections spread across multiple range bins, the high-resolution sensing function may use narrower bandwidth with relatively lower range solution.

On the other hand, if the continuous low-resolution sensing function has identified the object to be a high-speed object, because its reflection can be resolved even in low-resolution Doppler profile, the high-resolution sensing function may use short-duration signals and trade Doppler resolution for higher frame rate.

If the continuous low-resolution sensing function is capable of roughly localizing the object, it may also recommend the beam pattern and scene center to the high-resolution sensing function in the object detection notification. More specifically, if the object is close to the access point, the high-resolution sensing function may sweep the beam pattern to measure angular information. For a more distant object, using the beam pattern pointing towards the object may be sufficient. With a scene center close to the object distance, a lower unambiguous range can be adopted for the high-resolution sensing.

Figure 5:
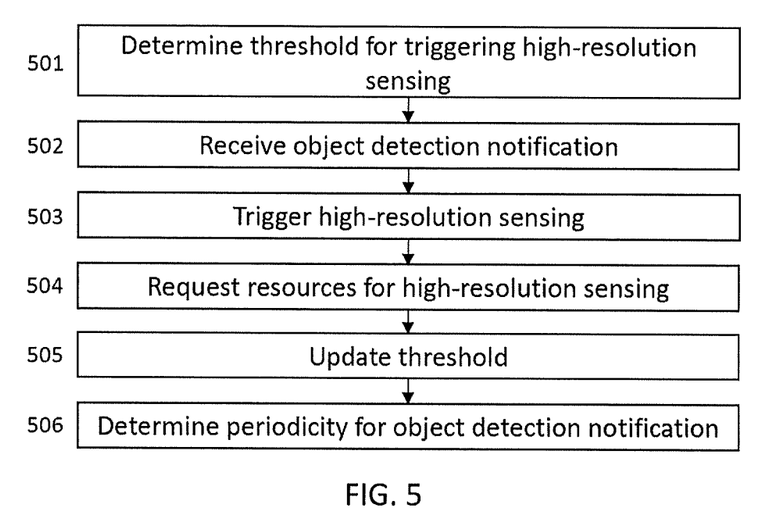
FIG. 5 illustrates a flow chart according to an example embodiment.

FIG. 5 illustrates a flow chart according to an example embodiment. FIG. 5 illustrates the operation of the sensing scheduling interface function 302 of FIG. 3. The sensing scheduling interface function 302 acts as an interface between the radio scheduler function 301 and the sensing functions 303, 304. The steps illustrated in FIG. 5 may be performed by an apparatus such as, or comprised in, a network element (e.g., an access point) of a wireless communication network, wherein the apparatus is capable of joint communication and sensing.

Referring to FIG. 5, in step 501, a threshold for triggering the high-resolution sensing function is determined. The threshold may comprise a threshold value for the confidence level, for example. The threshold may be based on a desired detection rate and/or a desired false alarm rate. For example, the threshold may be determined to limit the false alarm rate (which may otherwise cause increased overhead in high-resolution sensing) and/or guarantee a desired detection rate (to avoid missing objects in the sensing area of interest).

in step 502, an object detection notification is received from the continuous low-resolution sensing function. The object detection notification comprises at least one of: an object detection confidence level for one or more detected objects, one or more sensing metrics used for detecting the one or more objects, and/or preliminary sensing results, such as a category of the one or more detected objects.

In step 503, the sensing scheduling interface function triggers, based on the object detection notification received from the continuous low-resolution sensing function, the high-resolution sensing function to initiate sensing at a higher resolution (compared to the sensing performed by the continuous low-resolution sensing function). The sensing metric and/or confidence level indicated by the object detection notification may be used as a basis for creating the trigger for initiating the high-resolution sensing. For example, the high-resolution sensing may be triggered in response to the confidence level indicated by the object detection notification being above the threshold.

In step 504, upon triggering the high-resolution sensing function, the sensing scheduling interface transmits a resource request to the radio scheduler function to request radio resources for the high-resolution sensing function. For example, the resource request may comprise one or more quality of service (QoS) requirements, such as a tolerable scheduling latency for the high-resolution sensing. The amount of radio resources requested for the high-resolution sensing function may be determined, for example, based at least partly on the category of the one or more objects. The category may be indicated in the object detection notification received from the continuous low-resolution sensing function.

Examples of radio resource prioritization in the interaction between the sensing scheduling interface function and the radio scheduler function are presented in the following.

In case of scheduler implementation with legacy specification, the resource request from the sensing scheduling interface function may be treated as a QoS class with a tolerable scheduling latency, thus receiving the resources ahead of communication traffic within the latency budget. The latency budget may be pre-configured or determined by the sensing scheduler interface function according to the preliminary sensing results. To this end, high-resolution sensing for high-velocity objects may tolerate a short latency (e.g., a few milliseconds), while for low-velocity objects the tolerable latency may be higher (e.g., a few hundred milliseconds).

Alternatively, in a new scheduler design, the radio resource request for sensing may be treated as a priority over communication resource scheduling. In case the resources requested by the sensing scheduling interface function are already allocated for communication traffic (e.g., semi-persistent scheduling, configured grant, etc.), the radio scheduler function may prioritize the high-resolution sensing reference signals by puncturing the scheduled radio resources.

In step 505, the threshold may be updated based on a detection signal or false alarm feedback from the high-resolution sensing function. For example, each time a false alarm is received from the high-resolution sensing function, the threshold may be increased by a pre-defined value denoted as $\delta_{up}$. On the other hand, if a confirmed detection is received from the high-resolution sensing function, the threshold may be reduced by a pre-defined value denoted as $\delta_{down}$.

In step 506, the sensing scheduling interface function determines the notification periodicity for the object detection notifications from the continuous low-resolution sensing function, and indicates the determined periodicity to the continuous low-resolution sensing function. The notification periodicity may be determined, for example, based on the amount of available zero-overhead reference signals (duration and density) used by the continuous low-resolution sensing function. As another example, the notification periodicity may be determined based on the sensing use case in question, for example, the expected velocity of the objects in the sensing area of interest, where a higher velocity triggers shorter periods of low-resolution sensing compared to lower velocity.

Figure 6:
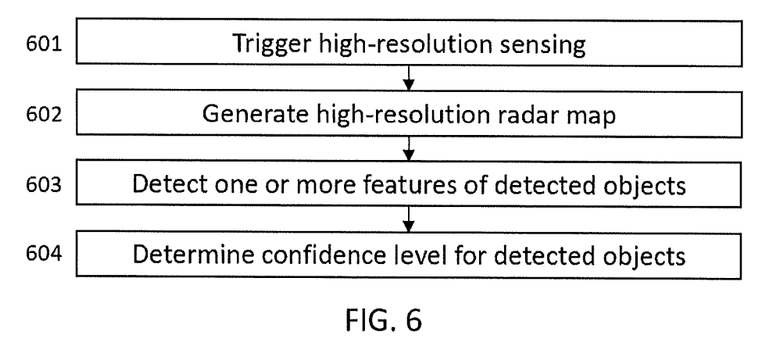
FIG. 6 illustrates a flow chart according to an example embodiment.

FIG. 6 illustrates a flow chart according to an example embodiment. FIG. 6 illustrates the operation of the high-resolution sensing function 304 of FIG. 3. The steps illustrated in FIG. 6 may be performed by an apparatus such as, or comprised in, a network element (e.g., an access point) of a wireless communication network, wherein the apparatus is capable of joint communication and sensing.

The high-resolution sensing function generates high-resolution radar maps e.g., a 2D map of the sensing area of interest, using for example range-doppler map to detect the location and velocity of one or more detected objects in the sensing area of interest. The advantage of the high-resolution sensing function is that, by using the information from the preliminary sensing, it can utilize the sensing reference symbols that are tailored to the sensing target. Some examples for this are presented above, for example using narrow-band reference symbols for velocity detection, where the duration of the reference signal is determined based on the expected range of velocity. The sensing algorithms and radar heatmap computations may be similar as explained above for the continuous low-resolution sensing function.

Referring to FIG. 6, in step 601, the high-resolution sensing function is initiated when triggered by the sensing scheduling interface function. The radio resources required for the high-resolution sensing function in time-frequency beam dimensions are allocated by the radio scheduler function. The resource dimension may include an access point, if the high-resolution sensing function operates on one or more selected distributed access points.

In step 602, the high-resolution sensing function performs high-resolution sensing over the radio resources allocated by the radio scheduler to generate one or more high-resolution radar maps, for example a 2D heatmap of the sensing area of interest.

In step 603, the high-resolution sensing function detects, based at least partly on the one or more radar maps, one or more features of one or more objects in the sensing area of interest. For example, the one or more features may comprise at least one of: the location, size, and/or velocity of the one or more objects.

In step 604, the high-resolution sensing function determines a confidence level for the one or more detected objects, and/or a false alarm. The false alarm refers to a false detection of an object (i.e., the detected object is not actually present). The confidence level and/or the false alarm may be reported to the sensing scheduling interface function.

Figure 7:
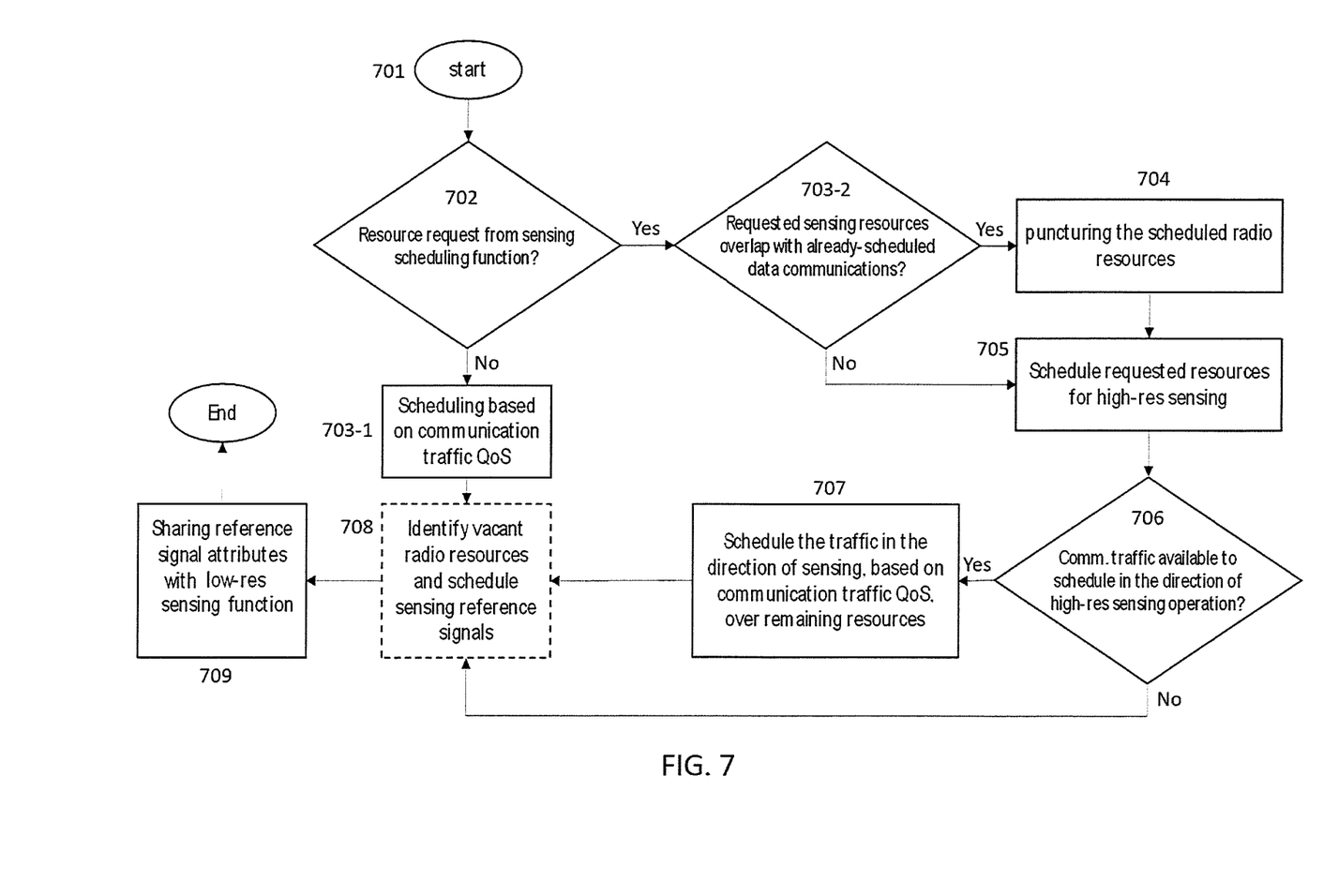
FIG. 7 illustrates a flow chart according to an example embodiment.

FIG. 7 illustrates a flow chart according to an example embodiment. FIG. 7 illustrates the operation of the radio scheduler function 301 of FIG. 3. The operation illustrated in FIG. 7 may be repeated at every scheduling instance, for example corresponding to time slots. The steps illustrated in FIG. 7 may be performed by an apparatus such as, or comprised in, a network element (e.g., an access point) of a wireless communication network, wherein the apparatus is capable of joint communication and sensing.

The radio scheduler function manages the resource-sharing between the communication and sensing functions. By default, it may follow communication traffic scheduling. Upon receiving a sensing resource request from the sensing scheduler interface function, the radio scheduler function may prioritize the resources for the sensing function according to the tolerated latency of the scheduling.

Referring to FIG. 7, in step 701, a resource request is received.

In step 702, the radio scheduler function determines whether the resource request is from the sensing scheduling interface function.

In step 703-1, if the resource request is not from the sensing scheduling interface function (702: no), the radio scheduler function performs scheduling based on communication traffic QoS.

Alternatively, if the resource request is from the sensing scheduling interface function (702: yes), the radio scheduler function may prioritize its radio resources for sensing by allocating the requested time-frequency beam resources to sensing. For example, the radio scheduler function may postpone transmission of data packets that were scheduled for transmission over the radio resources requested in the resource request from the sensing scheduling interface function.

In step 703-2, if the resource request is from the sensing scheduling interface function (702: yes), the radio scheduler function determines whether the requested sensing resources overlap with already-scheduled data communication.

In step 704, if the requested sensing resources overlap with already-scheduled data communication (703-2: yes), the radio scheduler function punctures the radio resources that were scheduled for data communication in order to free-up the resources. For example, the puncturing may mean that the radio resources initially intended for data symbols are overwritten by radar pilot symbols.

In step 705, if the requested sensing resources do not overlap with already-scheduled data communication (703-2: no), or following step 704, the radio scheduler function schedules, or allocates, the requested resources for high-resolution sensing.

In step 706, the radio scheduler function determines whether communication traffic is available to schedule in the direction of the high-resolution sensing.

In step 707, if communication traffic is available (706: yes), the radio scheduler function may schedule the communication traffic in the beam direction of the high-resolution sensing, based on communication traffic QoS, over the remaining resources. In other words, the radio scheduler function may utilize the opportunity of high-resolution sensing in a certain direction to schedule communication traffic for UEs in the same or nearby direction.

In step 708, if communication traffic is not available (706: no), or following step 703-1 or step 707, the radio scheduler function may identify vacant radio resources and make them available for sensing purposes. Thus, one or more sensing reference signals may be transmitted over those vacant resources in the absence of data traffic. However, it should be noted that step 708 is optional, and it may alternatively be skipped by continuing directly to step 709.

In step 709, the radio scheduler function shares one or more attributes of the reference signal(s) that it utilizes for communication with the continuous low-resolution sensing function. The attributes may comprise at least one of: time-frequency allocation, beam index, access point index in case of multi-AP operation, and/or transmit power level.

Figure 8:
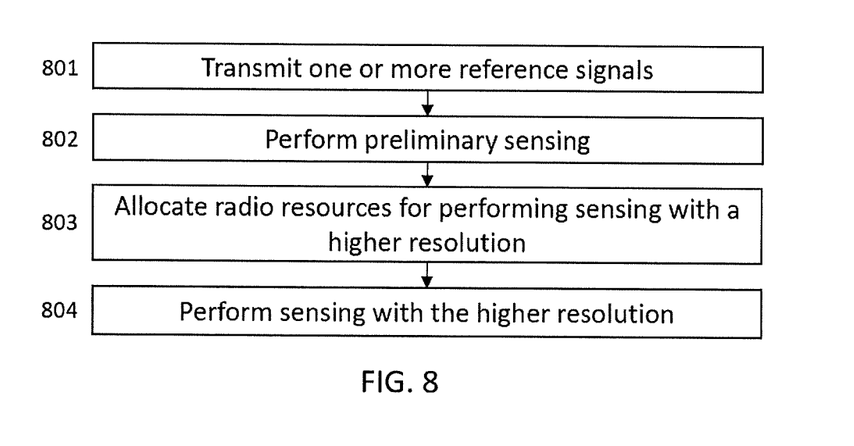
FIG. 8 illustrates a flow chart according to an example embodiment.

FIG. 8 illustrates a flow chart according to an example embodiment. The steps illustrated in FIG. 8 may be performed by an apparatus such as, or comprised in, a network element (e.g., an access point) of a wireless communication network, wherein the apparatus is capable of joint communication and sensing.

Referring to FIG. 8, in step 801, one or more reference signals are transmitted to one or more user devices. For example, the one or more reference signals may comprise at least one of: a primary synchronization signal (PSS), a secondary synchronization signal (SSS) and a physical broadcast channel (PBCH), a phase-tracking reference signal (PTRS), a physical downlink control channel (PDCCH) demodulation reference signal (DMRS), a physical downlink shared channel (PDSCH) DMRS, and/or a channel state information reference signal (CSI-RS). The PSS and SSS together with the PBCH may also be jointly referred to as a synchronization signal block (SSB).

In step 802, preliminary sensing over a sensing area of interest is performed based at least partly on the one or more reference signals. The preliminary sensing may refer to the continuous low-resolution sensing described above.

In step 803, radio resources are allocated, based at least partly on the preliminary sensing, for performing sensing with a higher resolution than a resolution of the preliminary sensing.

In step 804, the sensing with the higher resolution is performed over the sensing area of interest by using the allocated radio resources. The sensing with the higher resolution may refer to the high-resolution sensing described above.

The steps and/or blocks described above by means of FIGS. 4-8 are in no absolute chronological order, and some of them may be performed simultaneously or in an order differing from the described one. Other steps and/or blocks may also be executed between them or within them.

A technical advantage provided by some example embodiments is that they may provide opportunistic resource management for JCAS to enable low-overhead sensing along with ongoing communication operation, while taking advantage of the high-resolution sensing incidents for data communication. Thus, some example embodiments may enable more efficient use of radio resources in JCAS devices or systems.

Figure 9:
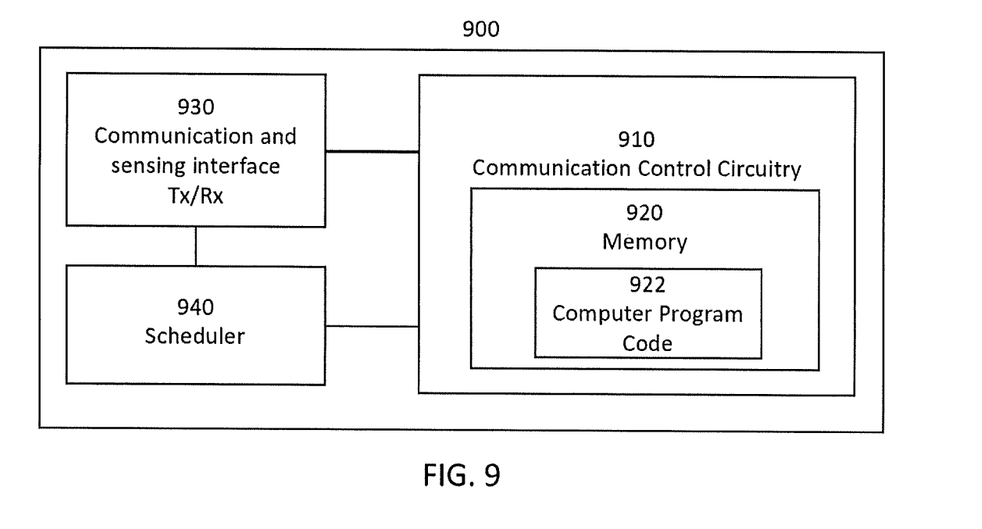
FIG. 9 illustrates an apparatus according to an example embodiment.

The apparatus 900 of FIG. 9 illustrates an example embodiment of an apparatus such as, or comprised in, a network element of a wireless communication network. The network element may also be referred to, for example, as a network node, a RAN node, a NodeB, an eNB, a gNB, a base station, an NR base station, a 5G base station, an access node, an access point (AP), a relay node, a repeater, an integrated access and backhaul (IAB) node, an IAB donor node, a distributed unit (DU), a central unit (CU), a baseband unit (BBU), a radio unit (RU), a radio head, a remote radio head (RRH), or a transmission and reception point (TRP).

The apparatus 900 may comprise, for example, a circuitry or a chipset applicable for realizing some of the described example embodiments. The apparatus 900 may be an electronic device comprising one or more electronic circuitries. The apparatus 900 may comprise a communication control circuitry 910 such as at least one processor, and at least one memory 920 storing instructions that, when executed by the at least one processor, cause the apparatus 900 to carry out some of the example embodiments described above. Such instructions may, for example, include a computer program code (software) 922 wherein the at least one memory and the computer program code (software) 922 are configured, with the at least one processor, to cause the apparatus 900 to carry out some of the example embodiments described above. Herein computer program code may in turn refer to instructions that cause the apparatus 900 to perform some of the example embodiments described above. That is, the at least one processor and the at least one memory 920 storing the instructions may cause said performance of the apparatus.

The processor is coupled to the memory 920. The processor is configured to read and write data to and from the memory 920. The memory 920 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 920 stores computer readable instructions that are executed by the processor. For example, non-volatile memory stores the computer readable instructions, and the processor executes the instructions using volatile memory for temporary storage of data and/or instructions.

The computer readable instructions may have been pre-stored to the memory 920 or, alternatively or additionally, they may be received, by the apparatus, via an electromagnetic carrier signal and/or may be copied from a physical entity such as a computer program product. Execution of the computer readable instructions causes the apparatus 900 to perform one or more of the functionalities described above.

The memory 920 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some example embodiments, structures of the frames used in the detected neighbour cells.

The apparatus 900 may further comprise a communication and sensing interface 930 comprising hardware and/or software for realizing communication connectivity according to one or more communication protocols as well as radar sensing capability. The communication and sensing interface 930 comprises at least one transmitter (Tx) and at least one receiver (Rx) that may be integrated to the apparatus 900 or that the apparatus 900 may be connected to. The communication and sensing interface 930 provides the apparatus with radar sensing capabilities and radio communication capabilities to communicate in the cellular communication system. The communication interface may, for example, provide a radio interface to one or more terminal devices. The apparatus 900 may further comprise another interface towards a core network such as the network coordinator apparatus and/or to the access nodes of the cellular communication system. The apparatus 900 may further comprise a radio scheduler 940 that is configured to allocate resources. The scheduler 940 may be configured along with the communication control circuitry 910 or it may be separately configured.

It is to be noted that the apparatus 900 may further comprise various components not illustrated in FIG. 9. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the example embodiments.

The invention claimed is:

1. An apparatus, comprising:
   at least one processor; and
   at least one memory storing instructions that, when executed with the at least one processor, to cause the apparatus to:
   transmit one or more reference signals to one or more user devices;
   perform preliminary sensing over a sensing area of interest based at least partly on the one or more reference signals;
   detect, based on the preliminary sensing, a presence of one or more objects in the sensing area of interest;
   determine, based at least partly on the one or more reference signals, a confidence level for detecting the presence of the one or more objects in the sensing area of interest;
   trigger, based at least partly on the confidence level, sensing with a higher resolution than a resolution of the preliminary sensing;
   allocate, based at least partly on the triggering, radio resources for performing the sensing with the higher resolution; and
   perform the sensing with the higher resolution over the sensing area of interest using the allocated radio resources.

2. An apparatus according to claim 1, wherein the instructions, when executed with the at least one processor, cause the apparatus to:
- identify vacant radio resources; and
- transmit the one or more reference signals over the vacant radio resources.

3. An apparatus according to claim 1, wherein the instructions, when executed with the at least one processor, cause the apparatus to:
- generate, based on the sensing with the higher resolution, one or more radar maps of the sensing area of interest; and
- detect, based at least partly on the one or more radar maps, one or more features of the one or more objects in the sensing area of interest, wherein the one or more features comprise at least one of location, size, or velocity.

4. An apparatus according to claim 3, wherein the instructions, when executed with the at least one processor, cause the apparatus to:
- determine a category of the one or more objects; and
- determine, based at least partly on the category of the one or more objects, an amount of the radio resources for the sensing with the higher resolution.

5. An apparatus according to claim 3, wherein the instructions, when executed with the at least one processor, cause the apparatus to:
- determine, based on at least a density and a duration of the one or more reference signals, one or more metrics for detecting the presence of the one or more objects in the sensing area of interest,
- wherein the confidence level is determined based at least partly on the one or more metrics.

6. An apparatus according to claim 3, wherein the confidence level is determined per beam of a set of beams.

7. An apparatus according to claim 3, wherein the sensing with the higher resolution is triggered in response to the confidence level being above a threshold, wherein the threshold is based on at least one of a desired detection rate or a desired false alarm rate.

8. An apparatus according to claim 7, wherein the instructions, when executed with the at least one processor, cause the apparatus to:
- update the threshold based on a detection or a false alarm feedback from the sensing with the higher resolution.

9. An apparatus according to claim 3, wherein the instructions, when executed with the at least one processor, cause the apparatus to:
- transmit, to a radio scheduler, a resource request for the sensing with the higher resolution, wherein the resource request comprises at least a tolerable scheduling latency for the sensing with the higher resolution; and
- allocate, with the radio scheduler, based on the resource request, the radio resources for the sensing with the higher resolution;
- wherein the sensing with the higher resolution is performed over the radio resources allocated with the radio scheduler.

10. An apparatus according to claim 9, wherein the instructions, when executed with the at least one processor, cause the apparatus to:
- postpone, with the radio scheduler, a transmission of data packets scheduled for transmission over the radio resources allocated for the sensing with the higher resolution.

11. An apparatus according to claim 10, where the instructions, when executed with the at least one processor, cause the apparatus to:
- puncture, with the radio scheduler, the radio resources scheduled for the data packets.

12. An apparatus according to claim 9, wherein the instructions, when executed with the at least one processor, cause the apparatus to:
- utilize, with the radio scheduler, after allocating the radio resources, vacant radio resources for communication with one or more user devices in a same or nearby direction compared to a beam direction used for the sensing with the higher resolution.

13. A method comprising:
- transmitting one or more reference signals to one or more user devices;
- performing preliminary sensing over a sensing area of interest based at least partly on the one or more reference signals;
- detecting, based on the preliminary sensing, a presence of one or more objects in the sensing area of interest;
- determining, based at least partly on the one or more reference signals, a confidence level for detecting the presence of the one or more objects in the sensing area of interest;
- triggering, based at least partly on the confidence level, sensing with a higher resolution than a resolution of the preliminary sensing;
- allocating, based at least partly on the triggering, radio resources for performing the sensing with the higher resolution; and
- performing the sensing with the higher resolution over the sensing area of interest using the allocated radio resources.

14. A non-transitory computer readable medium comprising instructions that, when executed by an apparatus, cause the apparatus to perform at least the following:
- transmitting one or more reference signals to one or more user devices;
- performing preliminary sensing over a sensing area of interest based at least partly on the one or more reference signals;
- detecting, based on the preliminary sensing, a presence of one or more objects in the sensing area of interest;
- determining, based at least partly on the one or more reference signals, a confidence level for detecting the presence of the one or more objects in the sensing area of interest;
- triggering, based at least partly on the confidence level, sensing with a higher resolution than a resolution of the preliminary sensing;
- allocating, based at least partly on the triggering, radio resources for performing the sensing with the higher resolution; and
- performing the sensing with the higher resolution over the sensing area of interest using the allocated radio resources.

* * * * *